(12) United States Patent
Merrill et al.

(10) Patent No.: US 12,052,943 B1
(45) Date of Patent: Aug. 6, 2024

(54) DIGITAL MODELING OF PROBABILISTIC CROP YIELDS FOR IMPLEMENTING AGRICULTURAL FIELD TRIALS

(71) Applicant: CLIMATE LLC, Saint Louis, MO (US)

(72) Inventors: Hunter Merrill, St. Charles, MO (US); Gardar Johannesson, Oakland, CA (US)

(73) Assignee: CLIMATE LLC, Saint Louis, MO (US)

( * ) Notice: Subject to any disclaimer, the term of this patent is extended or adjusted under 35 U.S.C. 154(b) by 601 days.

(21) Appl. No.: 17/181,956

(22) Filed: Feb. 22, 2021

Related U.S. Application Data

(60) Provisional application No. 62/980,063, filed on Feb. 21, 2020.

(51) Int. Cl.
| | | |
|---|---|---|
| *A01C 21/00* | (2006.01) | |
| *G05D 1/00* | (2006.01) | |
| *G06N 7/01* | (2023.01) | |
| *G06N 20/00* | (2019.01) | |

(52) U.S. Cl.
CPC ......... *A01C 21/005* (2013.01); *G05D 1/0016* (2013.01); *G05D 1/0212* (2013.01); *G06N 7/01* (2023.01); *G06N 20/00* (2019.01)

(58) Field of Classification Search
CPC ........ A01C 21/005; G06N 20/00; G06N 7/01; G05D 1/0016; G05D 1/0212; G05D 2201/0201
See application file for complete search history.

(56) References Cited

U.S. PATENT DOCUMENTS

| | | | | |
|---|---|---|---|---|
| 6,999,877 B1 * | 2/2006 | Dyer | ...................... | G06Q 10/00 |
| | | | | 702/5 |
| 11,263,707 B2 * | 3/2022 | Perry | ....................... | G06N 5/04 |
| 11,645,745 B2 * | 5/2023 | Wei | ................... | G06F 18/24133 |
| | | | | 382/224 |

* cited by examiner

*Primary Examiner* — Elias Desta
(74) *Attorney, Agent, or Firm* — Harness, Dickey & Pierce, P.L.C.

(57) ABSTRACT

Systems and methods for improving the training of machine learning models to generate probability distributions of yield values are presented. In an embodiment, a system stores a machine learning system trained to compute parameters for a probability distribution of yield values based on seeding density, seed type, and information specific to a field. The system receives inputs for a particular field and computes parameters for a probability distribution of yield. The system generates a probability distribution of yield using the parameters and uses the probability distribution to generate a yield guarantee value. The system supplies the yield guarantee value to a field manager computing device with a seed type and/or seed density recommendation. When the system receives input accepting the recommendation, the system generates one or more scripts which, when executed by an application controller, causes the application controller to control an agricultural implement to cause the agricultural implement to plant a seed on the field according to the recommendation.

21 Claims, 9 Drawing Sheets

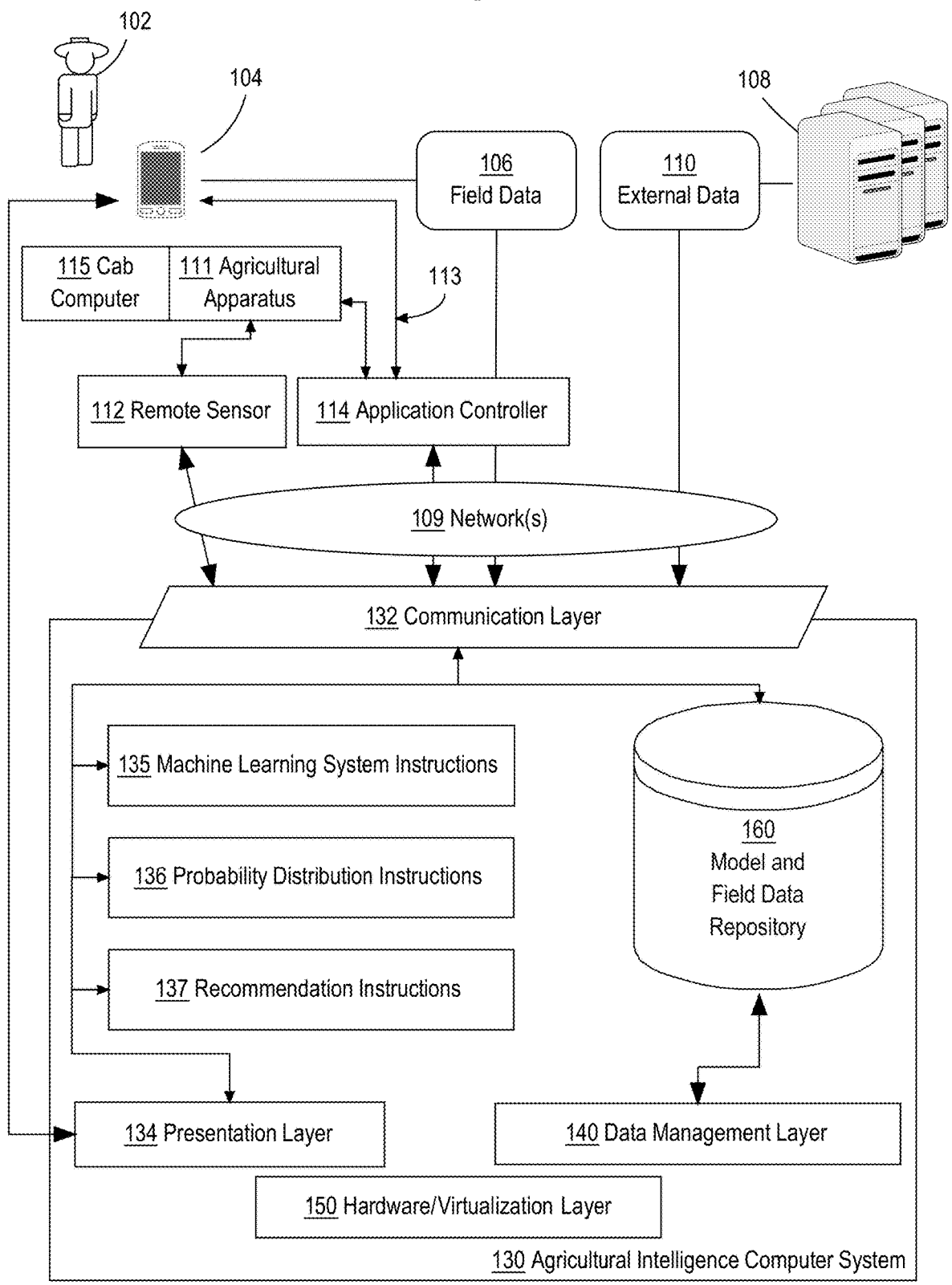

FIG. 5

| Data Manager | | | | | | | |
|---|---|---|---|---|---|---|---|
| Nitrogen \| Planting \| Practices \| Soil | | | | | | | |
| Planting 1 (4 Fields)<br>Crop Corn Product<br>Plant Date: 2016-04-12<br>ILU 112 \| Pop: 34000<br>[Edit] [Apply] | Planting 2 (0 Fields)<br>Crop Corn Product<br>Plant Date: 2016-04-15<br>ILU 83 \| Pop: 34000<br>[Edit] [Apply] | Planting 3 (0 Fields)<br>Crop Corn Product<br>Plant Date: 2016-04-13<br>ILU 83 \| Pop: 34000<br>[Edit] [Apply] | Planting 4 (1 Fields)<br>Crop Corn Product<br>Plant Date: 2016-04-13<br>ILU 112 \| Pop: 34000<br>[Edit] [Apply] | | | | + Add New Planting Plan |
| | CROP | PLANTED ACRES | PRODUCT | RELATIVE MATURITY | TARGET YIELD | POPULATION (AVG) | PLA |
| ☐ Select All | | | | | | | |
| ☐ Ames, IA 1<br>Corn \| 100 \| Boone, IA | Corn | — | DMC82-M | 112 | 160 | 34000 | Apr |
| ☐ Austin, MN 1<br>Corn \| 100 \| Fredricks, MN | Corn | — | DMC82-M | 114 | 160 | 36000 | Apr |
| ☐ Boone, IN 1<br>Corn \| 100 \| Boone, IA | Corn | — | DMC82-M | 112 | 150 | 34000 | Apr |
| ☐ Champaign 1<br>Corn \| 100 \| Champaign, IL | Corn | — | — | 112 | 200 | 34000 | Apr |
| ☐ E Nebraska 1<br>Corn \| 100 \| Burt, NE | Corn | — | — | 112 | 160 | 34000 | Apr |

*FIG. 6*

DIGITAL MODELING OF PROBABILISTIC CROP YIELDS FOR IMPLEMENTING AGRICULTURAL FIELD TRIALS

BENEFIT CLAIM

This application claims benefit under 35 U.S.C. § 119 of Provisional Patent Application No. 62/980,063, the entire contents of which are incorporated by reference as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2021 The Climate Corporation.

FIELD OF THE DISCLOSURE

The present disclosure relates to digital computer modeling and tracking of agricultural fields. Specifically, the present disclosure relates to improvements to probabilistic models of agronomic yield.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Optimizing the planting and management of agricultural fields can be extremely difficult given the vast array of options available to a farmer, including planting techniques, management techniques, and hybrid seeds. Differences in different agricultural fields can exacerbate these difficulties. While digital models of agricultural yield can be used to decrease the likelihood that the testing of agricultural techniques will not negatively impact crop yield, point estimates of agricultural yield through these models can still lead to situations where large scale tests of agricultural techniques on different fields can lead to an overall decrease in crop yield. Thus, there is a need for a system which can model crop yield based on a plurality of inputs that can be received prior to the planting of a field and create probabilistic estimates of crop yield.

SUMMARY

The appended claims may serve as a summary of the disclosure.

BRIEF DESCRIPTION OF THE DRAWINGS

In the drawings:

FIG. 1 illustrates an example computer system that is configured to perform the functions described herein, shown in a field environment with other apparatus with which the system may interoperate.

FIG. 5 depicts an example embodiment of a timeline view for data entry.

FIG. 6 depicts an example embodiment of a spreadsheet view for data entry.

DETAILED DESCRIPTION

Figure 2A:
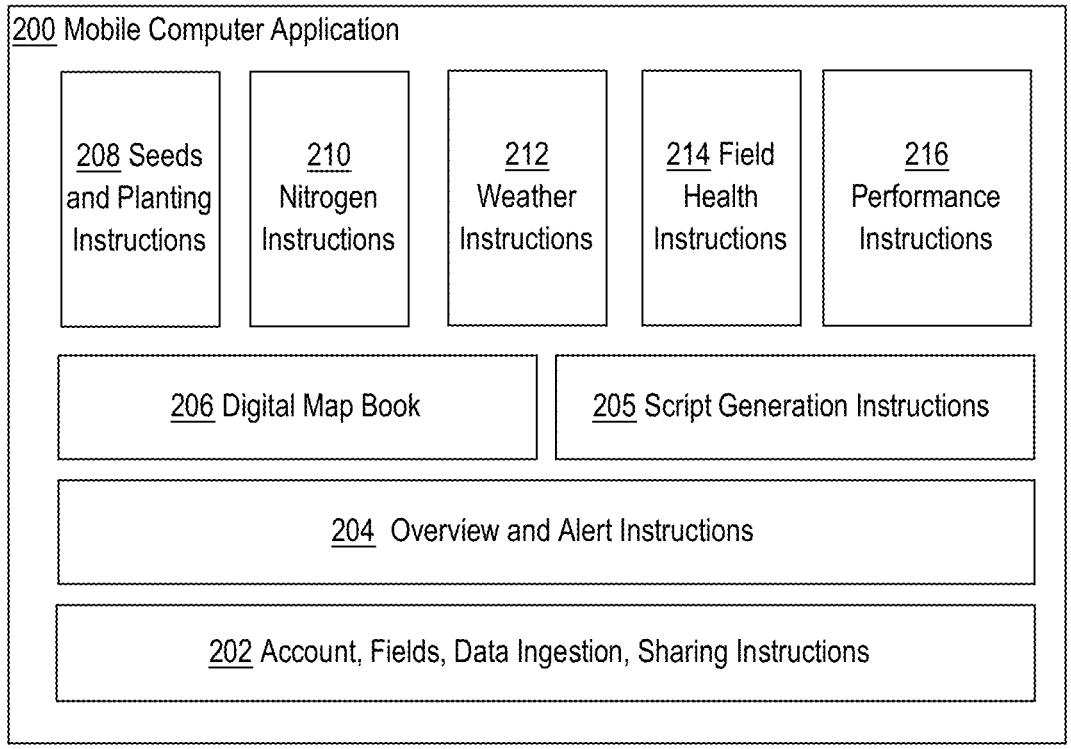
FIG. 2A and FIG. 2B illustrate two views of an example logical organization of sets of instructions in main memory when an example mobile application is loaded for execution.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. EXAMPLE AGRICULTURAL INTELLIGENCE COMPUTER SYSTEM
   2.1. STRUCTURAL OVERVIEW
   2.2. APPLICATION PROGRAM OVERVIEW
   2.3. DATA INGEST TO THE COMPUTER SYSTEM
   2.4. PROCESS OVERVIEW-AGRONOMIC MODEL TRAINING
   2.5. IMPLEMENTATION EXAMPLE-HARDWARE OVERVIEW
3. EXTENSIONS AND ALTERNATIVES
4. PROBABILISTIC CROP YIELD MODELING
   4.1. FUNCTIONAL OVERVIEW
   4.2. MACHINE LEARNING SYSTEM
   4.3. OUTPUT USAGE
5. MACHINE LEARNING MODELS
   5.1. ARTIFICIAL NEURAL NETWORKS
   5.2. ILLUSTRATIVE DATA STRUCTURES FOR NEURAL NETWORKS
   5.3. BACKPROPAGATION
   5.4. DEEP CONTEXT—RECURRENT NEURAL NETWORK
   5.5. DEEP CONTEXT—CONVOLUTIONAL NEURAL NETWORK

1. General Overview

Systems and methods for generating probability distributions of yield prior to planting are provided herein. According to an embodiment, a machine learning system is trained to compute parameters for a probability distribution of yield, such as center, tail, skew, and spread parameters of a sinh-arcsinh (SHASH) distribution. The machine learning system may be configured to generate location, soil feature, and/or environmental feature encodings as part of computing the parameters for the probability distribution of yield.

The machine learning system may be configured to compute an optimal density value and optimal yield value and constrain a center parameter based on the optimal density value, optimal yield value, and a planned seeding density. The probability distribution of yield may be used to select seed types and seed densities. The system may then control an agricultural implement to cause the agricultural implement to plant a field according to the seed type and seed density.

In an embodiment, a method comprises storing a machine learning system trained to compute parameters for a probability distribution of yield values from a plurality of planting inputs, the plurality of planting inputs comprising field specific inputs and crop specific inputs; receiving a plurality of particular planting inputs for a particular crop and a particular agricultural field; using the stored machine learning system and the plurality of particular planting inputs, computing particular parameters for a particular probability distribution of yield values for the particular agricultural field; generating the particular probability distribution of yield values from the particular parameters; using the particular probability distribution of yield values, determining a yield guarantee value; causing display, on a client computing device, of a recommendation to plant the particular crop on the particular agricultural field, the recommendation including the yield guarantee value; receiving input from the client computing device indicating acceptance of the recommendation and, in response, generating one or more scripts comprising computer readable instructions which, when executed by one or more agricultural implements, cause the one or more agricultural implements to plant the particular crop on the particular agricultural field.

2. Example Agricultural Intelligence Computer System 2.1 Structural Overview

FIG. 1 illustrates an example computer system that is configured to perform the functions described herein, shown in a field environment with other apparatus with which the system may interoperate. In one embodiment, a user 102 owns, operates, or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, aerial vehicles including unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines, harvesters, sprayers, and cultivators. Application controller 114 is communicatively coupled to agricultural intelligence computer system 130 via the network(s) 109 and is programmed or configured to receive one or more scripts that are used to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, California, is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks, or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U.S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
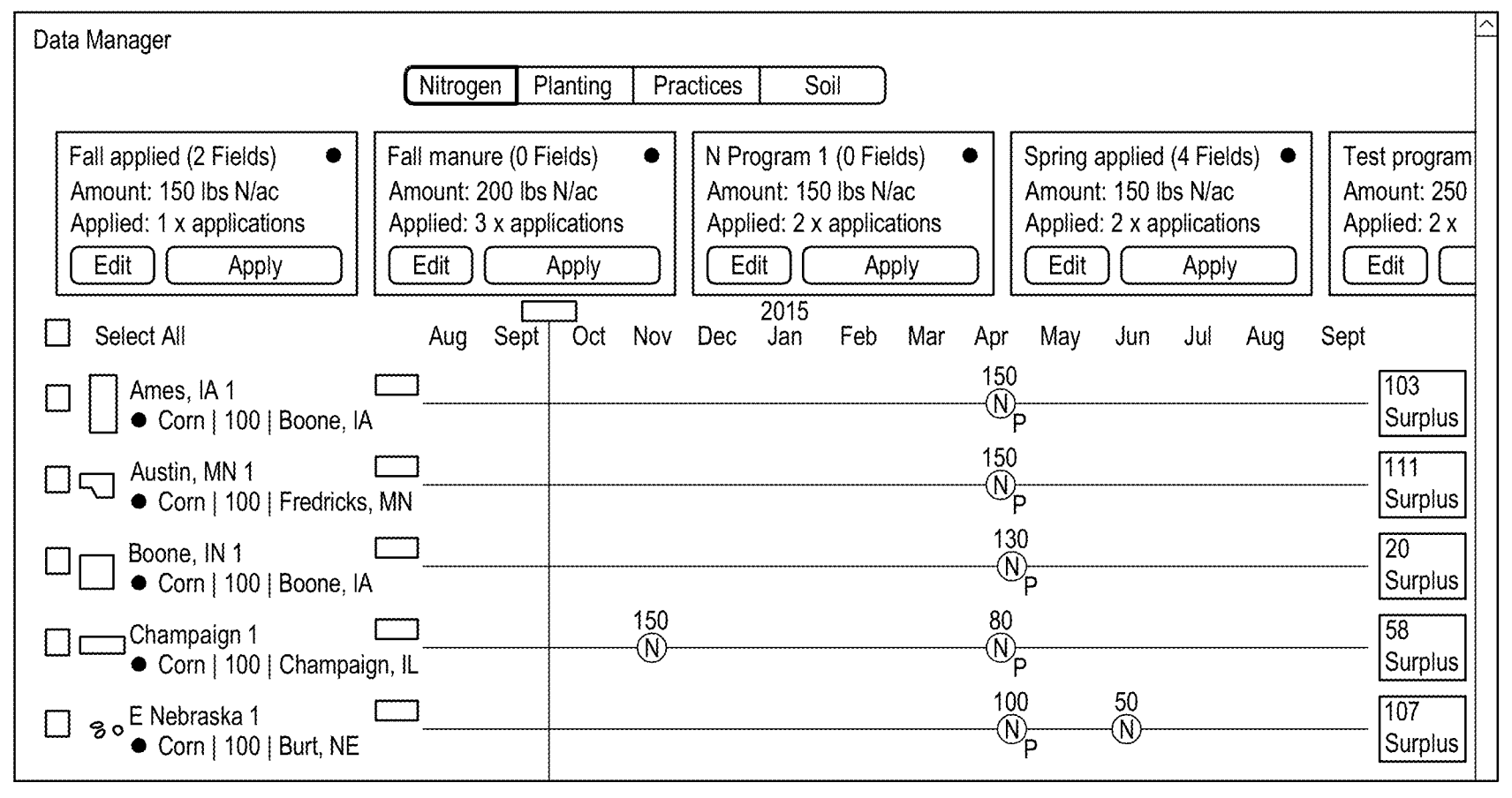

FIG. 5 depicts an example embodiment of a timeline view for data entry. Using the display depicted in FIG. 5, a user computer can input a selection of a particular field and a particular date for the addition of an event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Spring applied" program selected, which includes an application of 150 lbs N/ac in early April. The data manager may provide an interface for editing a program. In an embodiment, when a particular program is edited, each field that has selected the particular program is edited. For example, in FIG. 5, if the "Spring applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Spring applied" program is no longer being applied to the top field. While the nitrogen application in early April may remain, updates to the "Spring applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

In an embodiment, each machine learning system instructions 135, probability distribution instructions 136, and recommendation instructions 137 comprises a set of one or more pages of main memory, such as RAM, in the agricultural intelligence computer system 130 into which executable instructions have been loaded and which when executed cause the agricultural intelligence computing system to perform the functions or operations that are described herein with reference to those modules. For example, the machine learning system instructions 135 may comprise a set of pages in RAM that contain instructions which when executed cause performing the machine learning system training or computation functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of machine learning system instructions 135, probability distribution instructions 136, and recommendation instructions 137 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computing system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Machine learning system instructions 135 comprise computer readable instructions which, when executed by one or more processors, cause agricultural intelligence computer system 130 to train a machine learning system to compute parameters for a probability distribution of yield and/or use a trained machine learning system to compute parameters for a probability distribution of yield using field-specific inputs, seed type inputs, and a seeding density or population input. Probability distribution instructions comprise computer readable instructions which, when executed by one or more processors, cause agricultural intelligence computer system 130 to generate a probability distribution from parameters computed through the machine learning system. Recommendation instructions 137 comprise computer readable instructions which, when executed by one or more processors, cause agricultural intelligence computer system 130 to perform generating a seed type and/or density recommendation based on computed probability distributions of yield, generating yield guarantees based on the probability distributions of yield, and communication with a field manager computing device to provide the yield recommendation and yield guarantee.

Figure 4:
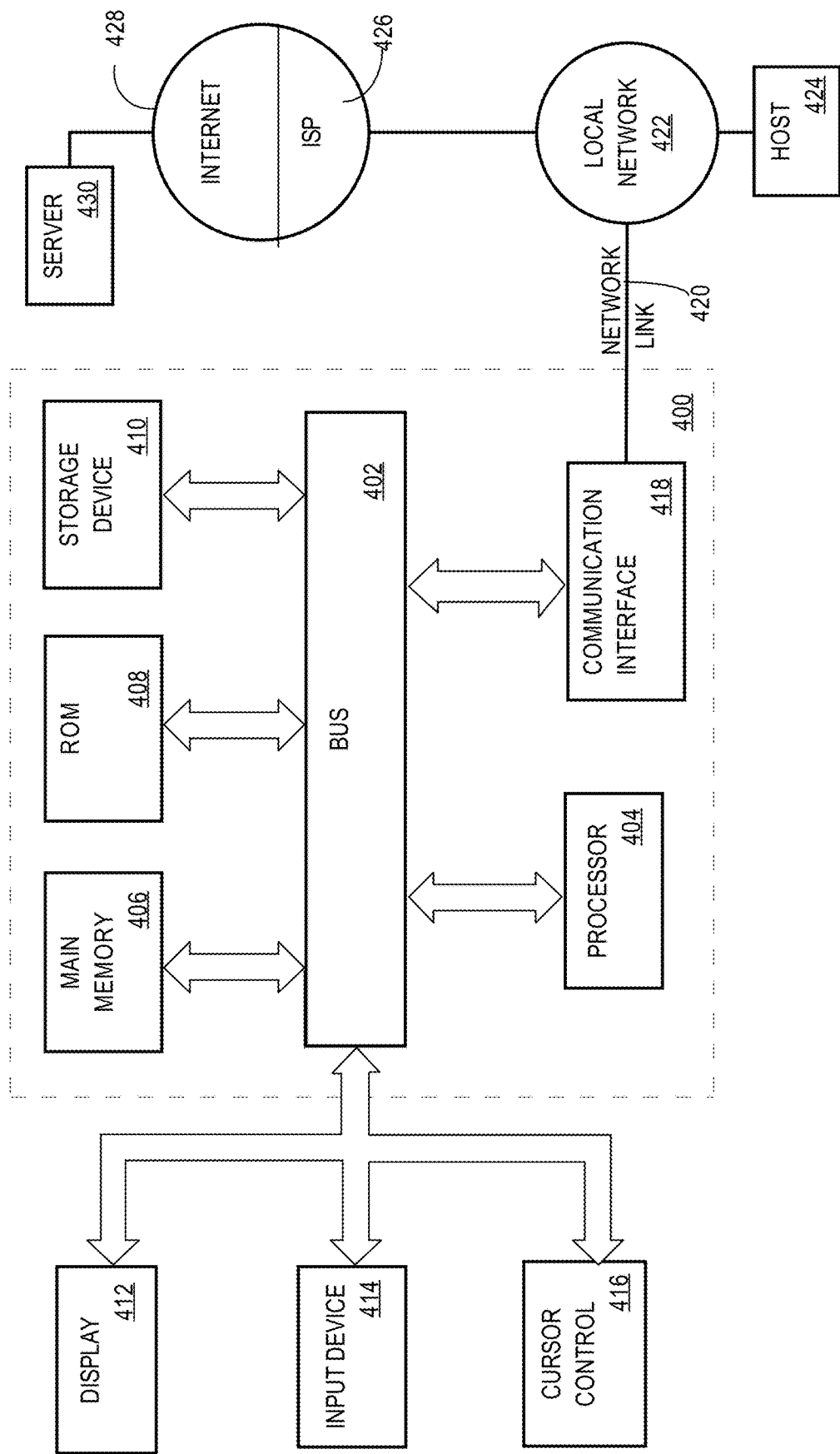
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smartphone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate, or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), Wi-Fi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114 which include an irrigation sensor and/or irrigation controller. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, California. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

Figure 2B:
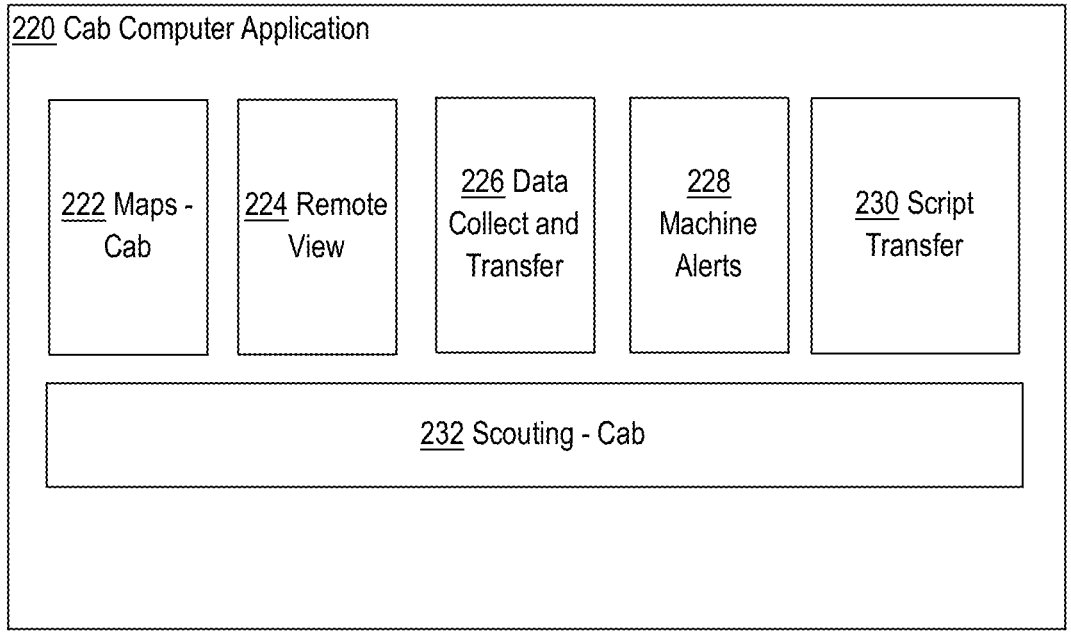

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account, fields, data ingestion, sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds, and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement, and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields and/or zones that have been defined in the system; example data may include nitrogen application data that is the same for many fields and/or zones of the same grower, but such mass data entry applies to the entry of any type of field data into the mobile computer application 200. For example, nitrogen instructions 210 may be programmed to accept definitions of nitrogen application and practices programs and to accept user input specifying to apply those programs across multiple fields. "Nitrogen application programs," in this context, refers to stored, named sets of data that associates: a name, color code or other identifier, one or more dates of application, types of material or product for each of the dates and amounts, method of application or incorporation such as injected or broadcast, and/or amounts or rates of application for each of the dates, crop or hybrid that is the subject of the application, among others. "Nitrogen practices programs," in this context, refer to stored, named sets of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly, or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium), application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights, and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the field manager computing device 104, agricultural apparatus 111, or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, California, may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or Wi-Fi-based position or mapping apps that are programmed to determine location based upon nearby Wi-Fi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220,852, filed on Sep. 18, 2015, may be used, and the present disclosure assumes knowledge of those patent disclosures.

2.4. Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, fertilizer recommendations, fungicide recommendations, pesticide recommendations, harvesting recommendations and other crop management recommendations. The agronomic factors may also be used to estimate one or more crop related results, such as agronomic yield. The agronomic yield of a crop is an estimate of the quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
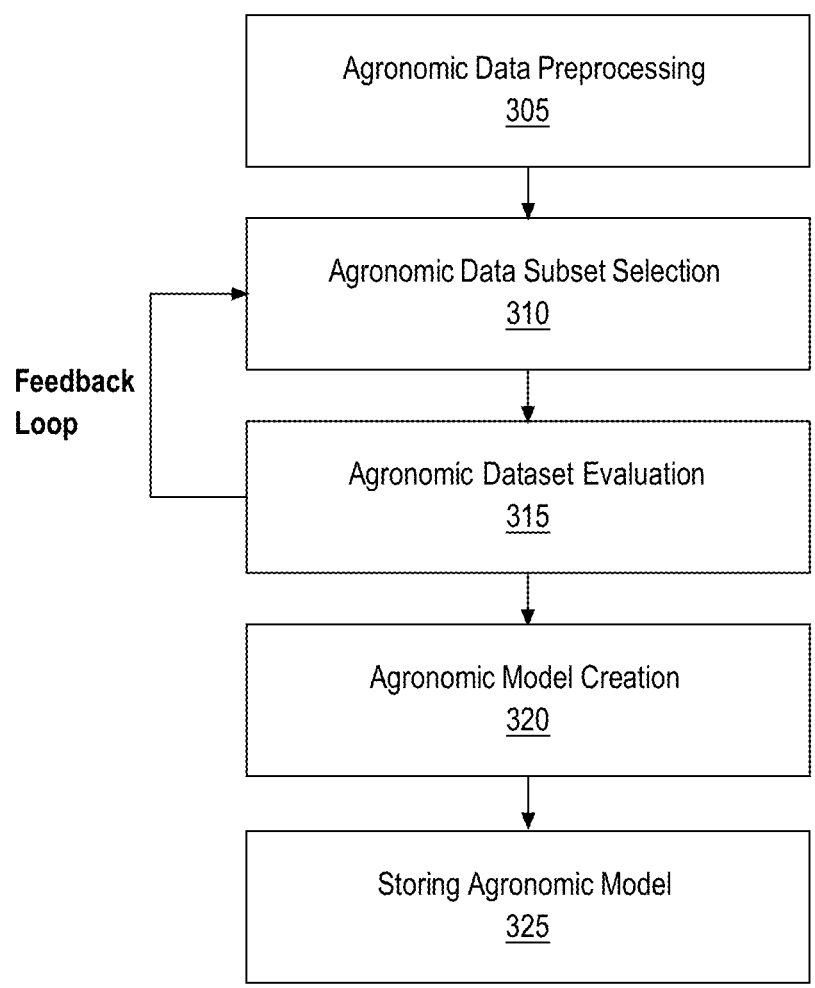
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise, distorting effects, and confounding factors within the agronomic data including measured outliers that could adversely affect received field data values. Embodiments of agronomic data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared and/or validated using one or more comparison techniques, such as, but not limited to, root mean square error with leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5. Implementation ExampleHardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

4. Probabilistic Crop Yield Modeling

4.1. Functional Overview

In an embodiment, the agricultural intelligence computer system uses a probability density function to compute probabilities of different yields of an agricultural field. A probability distribution indicates not just the likely yield values, but the probabilities of yield values being above or below a particular yield value. The agricultural intelligence computer system may use the probability density functions to compute a guaranteed yield value. For example, the agricultural intelligence computer system may generate a probability density function for a particular field based on one or more data values corresponding to the field. The agricultural intelligence computer system may select a particular yield value from the probabilistic function such that the likelihood of the yield being lower than the yield value based on the probability distribution is a particular percentage, such as 10%. Additionally, or alternatively, the agricultural intelligence computer system may compute probabilities of yield being within a particular range, such as between 150-175 bu/ac. The agricultural intelligence computer system may select a range with a 90% likelihood of yield and compute the guaranteed yield value as the bottom value of the range.

To use the probability distribution to generate the guaranteed yield value, the agricultural intelligence computer system may generate the probability density functions far in advance of current field or weather conditions, such as a year prior to the planting of the agricultural field. Thus, the agricultural intelligence computer system may generate a model that is trained on input features which can be determined in advance of the planting of a crop. For instance, the agricultural intelligence computer system may receive previous yield data for one or more fields, the previous yield data comprising an agronomic yield of a field planted with a particular hybrid seed, soil characteristic data, such as cation exchange capacity (CEC), field topology data, such as field acreage, weather data, such as precipitation, remotely sensed data, such as satellite imagery, management practices, such as seeding rate and occurrence or non-occurrence of crop rotation, and seed data, such as traits of the particular hybrid seed. The agricultural intelligence computer system may train the digital model using the soil characteristic data, field topology data, management practices, and seed data as input and the yield as outputs.

The model may be a regression model, such as a generalized additive model (GAM), a tree-based model, a machine learning model, and/or a neural network model. The model may be configured to estimate a distribution, such as a sinh-arcsinh (SHASH) distribution. Alternatively, the agricultural intelligence computer system may use alternative methods of quantifying uncertainty, such as Monte Carlo sampling. As an example, a four parameter sinh-arcsinh distribution may be trained with the acreage of the field as an input feature for the tail parameter, crop rotation and acreage of the field as input features for the shape and skew parameter, and a plurality of features as input features for the center parameter, such as acreage, crop rotation, seeding density, precipitation, satellite imagery, and hybrid seed traits. Monte Carlo sampling of probabilistic predictions of the four SHASH parameters may be combined to create a single probability distribution. Monte Carlo sampling may also be performed on the inputs, such as historical observed precipitation or probabilistic forecasts of precipitation.

While methods are described herein with respect to computing parameters for a single parametric probability distribution, other embodiments may include a model configured to compute a plurality of parametric probability distributions, such as normal distributions, with each distribution having a weight parameter, location, and scale parameter, and/or a model configured to compute a monotonic transformation that is then applied to a base probability distribution function, such as an autoregressive normalizing flow layer which implements a masked autoencoder for distribution estimation (MADE), equations for which are publicly available through TensorFlow.

The probability distributions described herein may be used to generate a guaranteed value for a particular agronomic field planting a particular seed hybrid. In an example method, an agricultural intelligence computer system receives past yield data for one or more fields, including past yields and one or more past input features. The agricultural intelligence computer system trains a digital model of crop yield, such as a GAM, to predict parameters for a probability distribution of yield, such as a SHASH distribution. The agricultural intelligence computer system may then use data relating to a particular agronomic field and a particular crop hybrid to compute parameters for a SHASH distribution for the particular field and crop hybrid. Using the SHASH distribution, the agricultural intelligence computer system may select a particular value as a guaranteed yield value.

The computation of a probability distribution of yield as used herein benefits the agricultural intelligence computer system by giving the agricultural intelligence computer system access to field and hybrid specific data which would have been otherwise unavailable. For example, the probability distributions generated using the models described herein allow the agricultural intelligence computer system to select a guaranteed yield value based on a likelihood of yield being below or above the selected value, thereby ensuring that yield guarantees sent to field manager computing devices are high enough to depict an increase in yield for agronomic fields while being low enough that few fields will perform under the guarantees. By providing said guarantee values to field manager computing devices, the agricultural intelligence computer system uses input data to generate improved interfaces which allow field managers to make better informed decisions for planting agronomic fields.

Figure 7:
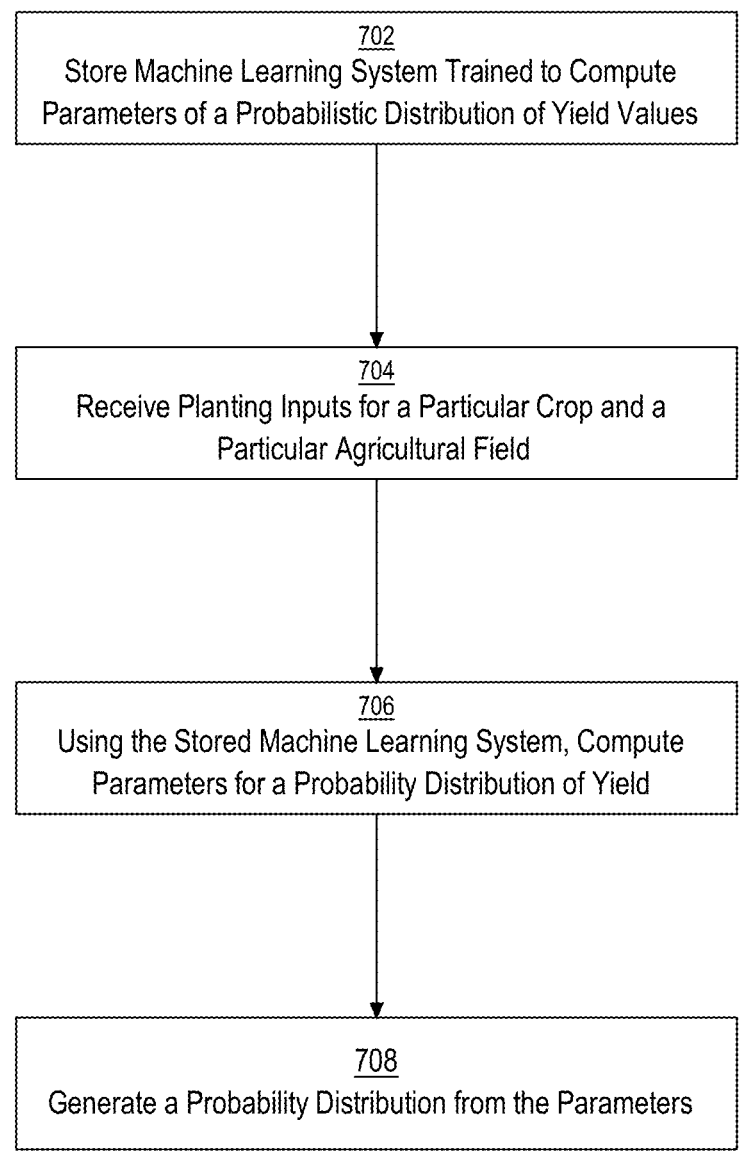
FIG. 7 depicts an example method for using a machine learning system to generate probabilistic yield values for an agricultural field.

FIG. 7 depicts an example method for using a machine learning system to generate probabilistic yield values for an agricultural field. The method of FIG. 7 may be implemented prior to planting of a crop, thereby allowing for the creation of different probabilistic yield values for different crops or prescriptions. The system may use the methods described in FIG. 7 to select seeds, seeding densities, or other prescription values for agricultural fields, generate yield guarantees, or otherwise affect the planting or management of a crop on an agricultural field.

At step 702, the agricultural intelligence computer system stores a machine learning system trained to compute parameters of a probabilistic distribution of yield values. For example, the system may store a GAM or other machine learning system, such as a deep neural network. Examples of machine learning systems and methods of training the machine learning systems are described further herein. The machine learning systems may be trained to compute parameters for a probability distribution. For example, the machine learning system may be configured to output a mean and standard deviation for a normal distribution or a mean, skew, tail, and spread for a more complex distribution, such as a SHASH distribution. The probability distribution may comprise a probability distribution of yield values for an agricultural field or portion thereof.

At step 704, the system receives planting inputs for a particular crop and a particular agricultural field. For example, the system may receive data identifying a type of seed to be planted on the particular agricultural field, a seeding population density for the particular agricultural field, soil information for the particular agricultural field, past weather information for the particular agricultural field, and/or management information for the particular agricultural field. In an embodiment, the system receives the planting inputs over a network, such as from a field manager computing device. Additionally, or alternatively, the system may receive the inputs from one or more other processes of the system, such as a process which selects from a plurality of options of seed types and/or planting densities. Information related to a field may be received from a database or other data repository which stores past data for individual agricultural fields, such as field location, past weather, past yield, or other information relating to the particular agricultural field.

At step 706, the system uses the stored machine learning system to compute parameters for a probability distribution of yield. For example, the system may generate an output from the machine learning system using information relating to the agricultural field, to a particular crop, and/or to a seeding density as inputs into the machine learning model. Thus, the output parameters may be specific to a particular agricultural field. In an embodiment, the system computes parameters for the probability distribution of yield of multiple types. For example, one or more layers of a deep neural network may be stochastic, thereby causing subsequent computations to produce different results. The system may thus prepare a plurality of results for a particular agricultural field, seed, and planting density.

At step 708, the system generates a probability distribution from the parameters. The probability distribution defines a probabilistic expected yield for the agricultural field. The probabilistic yield allows the system to generate recommendations for different seeds and/or cause performance of agricultural activities on an agricultural field based on computed results. Methods of utilizing the probability distribution are described further herein.

4.2. Machine Learning System

The machine learning system may comprise a linear model, such as a linear regression model or GAM, or a deep learning architecture, such as a deep neural network. The system may train the machine learning system using previous data from a plurality of agricultural fields. For example, the system may receive harvested yield data for a plurality of agricultural fields, one or more variable inputs, such as seed density or seed type, and one or more field specific inputs, such as location, weather data, soil data, management data, or other information relating to the agricultural field. The data may include generalized data, such as a seed type for a whole field, or data individualized to specific locations. For example, a harvester may generate yield data while harvesting an agricultural field with the yield data defining, for each of a plurality of locations, a yield for the location and GPS coordinates of the location. Data may additionally be available at different levels of granularity. For example, soil measurements may be available for locations that are five meters by five meters while weather information is available for locations that are ten kilometers by ten kilometers.

In an embodiment, training datasets are generated from the received data to place the received data in a form that can be used to train the machine learning model. For example, data for an agricultural field may be available at different levels of granularity. Additionally, agricultural fields may receive different treatments in different locations, such as different seeds planted or different seeding densities, thereby affecting a total computation. In an embodiment, for a particular set of data for an agricultural field, the system separates the data into groups comprising a same seed type and same seeding density. The system may then compute values for each group with a unique seed type and seeding density combination. For example, the system may compute an average location for each group, an average yield, average soil values, such as average cation exchange capacity (CEC) or average soil pH, or other values averaged over each location in a particular group.

One or more inputs may also be derived for each training dataset. For example, the system may use planting and harvest information from a plurality of fields to compute a relationship between optimal seeding rate density and yield environment. As an example, a relationship between yield environment and seeding density may be defined as:

$$\log(d) = b + m \cdot \log(y)$$

where d is the seeding density, b is an intercept parameter, m is a slope parameter, and y is a yield. For a particular seed type, the system may use previous planting densities and yields for a plurality of fields to derive the intercept and slope parameters for a plurality of different seed types. The system may then use parameters for a particular seed to derive a yield value for a seeding rate as:

$$y_d = e^{\frac{\log(d) - b}{m}}$$

which may then be used as an input into the model.

In an embodiment, training datasets used to compute parameters of a probability distribution of yield comprise, as inputs, a seed density, a derived yield value as described above, information related to a planted seed, such as a seed's trait stack, soil information for a field, such as CEC, weather information for a field, such as precipitation, and other information, such as an identifier of a previously planted crop, a previous yield, a field identifier, a grower identifier, or a number of acres harvested on the field. The output may comprise an agronomic yield. To train the model to compute parameters for a probability distribution using the yield as an output, the system may use, as a loss function, the negative log likelihood of the yield value. The system may then compute parameters for the probability distribution that minimize the loss function, such as through backpropagation.

In an embodiment, a different subset of the features may be used to separately compute each of the parameters of the probability distribution. For example, the center parameter may be computed from the seed density, derived yield value, trait stack, CEC, previous year's yield, previous year's crop identification, and number of acres harvested, the spread and skew may be computed using the previous year's crop and number of acres harvested, and the tail may be computed using only the number of acres harvested. Each computation may use its own set of neural network layers which are learned through the training.

Figure 8:
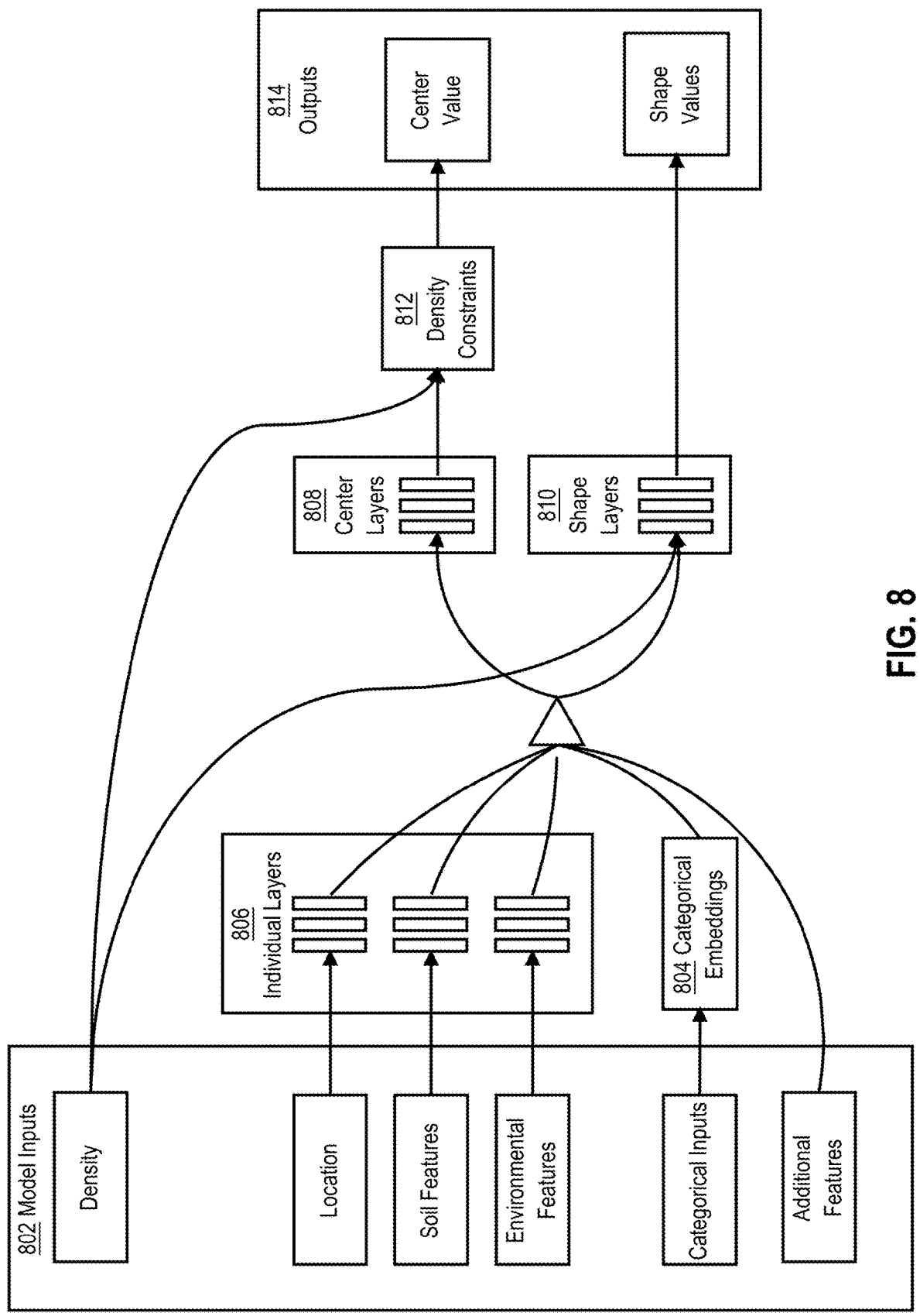
FIG. 8 depicts an example machine learning system for computing parameters for a probability distribution of yield.

FIG. 8 depicts an example machine learning system for computing parameters for a probability distribution of yield. The model of FIG. 8 combines a plurality of different technical improvements which can be used individually or combined. These technical improvements include using separate sets of neural network layers for location features, soil features, and environment features, computing embeddings from categorical inputs, combining density with the outputs of previous neural network layers to compute the parameters, computing the shape parameters separate from the center parameter, constraining the center parameter based on the density value, and generating a plurality of probability distributions for a single set of inputs based on stochastic parameters. Each of the above, alone and in combination, directly contribute to technical purposes of automated control of agricultural implements, agricultural modeling, and visualization outputs, each of which are improved through the modeling of probability distributions of yields which can be used to select seeds for planting, generate yield guarantees, provide dynamic visualizations of yield, and/or providing instructions to agricultural implements.

Model inputs 802 comprise input features which are used to train the machine learning system. Model inputs 802 include density, location, soil features, environmental features, categorical inputs, and additional features. Model inputs 802 comprise one example of types of inputs that can be used to train the machine learning model and more or less features may be used in different implementations. For example, an embodiment may be executed without the soil features as soil variances may be captured by location features.

The density of model inputs 802 comprises a seeding population for the agricultural field or portion thereof. The location input comprises information defining a location of the agricultural field, such as latitude and longitude coordinates and/or a size of the agricultural field. In an embodiment, the location input comprises an average location, such as an average latitude and longitude of all locations on the field. The soil features may include one or more of organic matter, potential hydrogen (pH), CEC, a soil type identifier and/or percentages of sand, silt, and clay, a drainage class of the soil, and/or a target relative maturity. The environmental features may include temperature and/or precipitation information for a previous year, such as maximum and minimum daily temperature and average or total precipitation. The environmental features may additionally or alternatively include temperature or precipitation forecasts prior to the planting of the crop.

Individual layers 806 comprise layers of machine learning system, such as a neural network, that comprise a series of weights which are used to generate learned outputs based on input values. In an embodiment, individual layers 806 comprise layers that separately correspond to individual input types. For example, in FIG. 8, the layers that correspond to location are separate from the layers that correspond to soil features and environmental features. Thus, each of the location input data, soil feature input data, and environmental feature input data may be processed separately through one or more layers before being combined in one or more other layers of the machine learning system. The output of the last layer of the individual layers 806 produces an encoding for the feature. Thus, the three sets of individual layers 806 depicted in FIG. 8 may produce a location encoding, an environmental encoding, and a soil feature encoding.

While FIG. 8 depicts three types of data separately being trained through individual layers, embodiments may include more or less types of data or combinations thereof. For example, the environmental features may be combined with the soil features and processed through one set of layers. Additionally, or alternatively, a different set of layers may be used to produce a product or genetics encoding which uses inputs relating to the seed, such as the trait stack, relative maturity, or average yield for the seed type.

The categorical inputs may include non-numeric data relating to the field or crop. Examples of categorical inputs include a product identifier, a field identifier, a farm identifier, or a year. The system may generate categorical embeddings 804 from the categorical inputs. For example, the system may store data mapping different categorical inputs to different vectors, such as a three dimensional vector of parameters. The vector for each categorical input may be estimated along with other parameters of the model. Thus, a first seed type may be mapped to a first vector of values and a second seed type may be mapped to a second vector of values.

Additional features may comprise non-categorical features which are fed into the model separate from the above described features. Examples of additional features may include a derived yield value, management information, such as crop rotation information, planting and harvest date, or application data of fertility chemicals, pesticides, or watering, or field environment information, such as field location, size, yield history, or other soil information.

In an embodiment, features are concatenated together before being fed into center layers 808 and shape layers 810. Center layers 808 and shape layers 810 comprise layers that are trained to separately compute the center parameters and the shape parameters. In an embodiment, the shape layers 810 comprise a plurality of sets of layers with each set corresponding to a different shape parameter. The shape layers 810 may be configured to compute the shape parameters from inputs comprising the seeding density, the encodings from the individual layers 806, the categorical embeddings 804, and any additional features. In an embodiment, centers layer 808 are configured to compute the center value using the same inputs.

Additionally, or alternatively, the center layers 808 may receive inputs comprising the encodings, embeddings, and additional features without the density information. In an embodiment, the center layers 808 are configured to compute an optimal yield value and an optimal seeding density value. The center value of outputs 814 may be computed using density constraints 812, the density input, and the optimal yield and optimal density values computed through center layers 808. For example, the center value may be computed as:

$$C = y_o \frac{d_a}{d_o} e^{1-\frac{d_a}{d_o}}$$

where $y_o$ is the optimal yield, $d_o$ is the optimal seeding density, and da is the actual seeding density.

Outputs 814 comprise outputs of the machine learning system. Outputs 814 comprise a center value and shape values. The shape values may include a skew, tail, and spread values. The center value may comprise a mean value for the probability distribution. As described above, the negative log likelihood of the actual yield in the training dataset is used to train the model to compute each of the shape values and the center value through the sets of dense neural network layers.

In an embodiment, one or more of the sets of layers are configured to be stochastic. For example, the individual layers 806 may comprise Bayesian layers, such as the DenseFlipout available through Tensorflow. Thus, subsequent computations through the machine learning system may produce different results despite using the same inputs. By including stochastic layers, the model is able to propagate uncertainty in the effects of location, soil features, and/or environmental features. In an embodiment, the system computes a plurality of results through the machine learning system for one or more of the parameters of the probability distributions. The system may use the plurality of results to generate an ensemble of parameters, thereby providing a plurality of probability distributions. The plurality of probability distributions can be used to generate recommendations and/or provide greater risk information.

4.3. Output Usage

In an embodiment, the systems and methods described herein are used to select seeds and/or seed populations for planting in an agricultural field. For example, the system may compute outputs for a particular agricultural field for a single seed type and a plurality of seeding densities. The system may then select a seeding density that produced a distribution with a highest average yield value or a distribution with a highest range of yield values. The system may then generate a script comprising computer readable instructions which, when executed by an agricultural implement, cause the agricultural implement to plant the seed at the identified seeding density. A similar method may be utilized to identify a best seed for a particular seeding density and/or to select both a seed and a seeding density.

In an embodiment, the systems and methods described herein used to generate yield guarantees for a particular seed type and seeding density. For example, the system may use the generated probability distribution to identify a yield value which has a 90% chance of being reached or exceeded based on the probability distribution. The system may generate a display of the yield guarantee and cause the display to be displayed on a client computing device. In an embodiment, the generation of the yield guarantee is performed in response to user input selecting a seed or seeding rate. When the system receives an updated seed or seeding rate selection, the system may compute new yield guarantees and cause display of the new yield guarantees on the client computing device. Using this process, the system provides an improved interface where results of different planting decisions can be displayed immediately.

Figure 9:
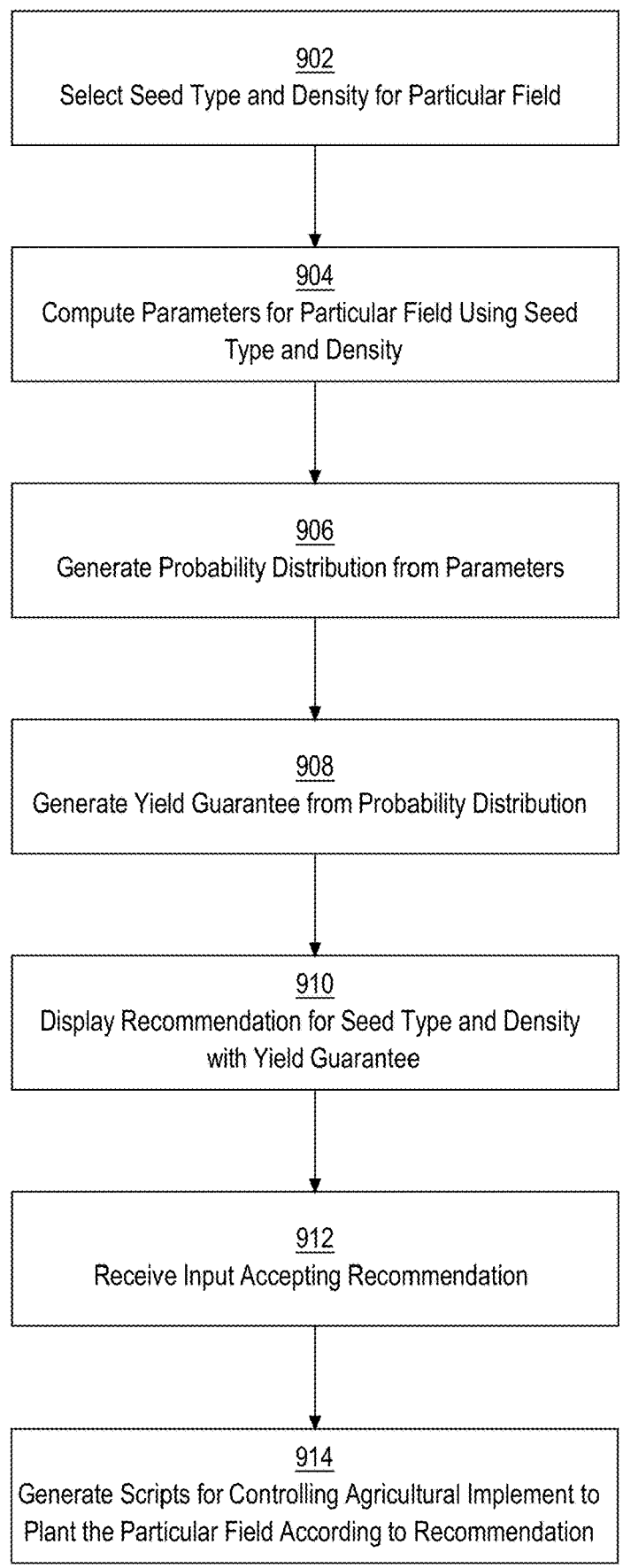
FIG. 9 depicts an example method for controlling an agricultural implement based on an output of the machine learning system.

In an embodiment, the system uses the methods described herein to provide improved displays and to control agricultural implements to execute a planting prescription. FIG. 9 depicts an example method for controlling an agricultural implement based on an output of the machine learning system. At step 902, a seed type and density are selected for a particular agricultural field. The seed type or density may be selected by the agricultural intelligence computer system, such as through the methods described herein wherein outputs are computed with different seed types or seed densities. Additionally, or alternatively, the seed type or density may be preselected. For instance, an administrator may select a seed type for generating a recommendation. Additionally, or alternatively, the seed type or density may be selected based on input from a field manager computing device indicating a desired seed type, density, or agronomic yield.

At step 904, the system computes parameters for the particular agricultural field using the selected seed type and density. For example, the system may identify parameters for the particular agricultural field to use as inputs, such as soil features, environmental features, or location features. The system may combine the field specific inputs with seed specific inputs for the selected seed type and the selected seeding density and compute output parameters through the trained machine learning system using the inputs.

At step 906, a probability distribution is generated from the parameters. For example, the system may generate a probability distribution of yield, such as a SHASH distribution, that conforms to the generated parameters. In an embodiment, the system computes a plurality of output parameters and generates a plurality of probability distributions, such as when the parameters are computed to be stochastic using the methods described herein.

At step 908, a yield guarantee is generated from the probability distribution. The yield guarantee may comprise a range, such as a 90% range where 5% of the distribution is below the low end of the range and 5% of the distribution is above the high end of the range, or a particular value, such as a yield value corresponding to a bottom 10% of the distribution.

At step 910, a recommendation is displayed for the seed type and density along with the yield guarantee. For example, the agricultural intelligence computer system may cause display of a graphical user interface on a field manager computing device which depicts the seed type, the seeding density, and the yield guarantee. The display may include options for selecting different seeds or seeding densities. In response to a selection of a different seed or seeding density, the method may proceed to step 904 where new parameters are computed and used to generate a new probability distribution, through which a new yield guarantee is generated. The system may then update the graphical user interface to depict the new yield guarantee for the new selection.

The recommendation may comprise a recommendation for planting a whole field with the identified seed type and density and/or planting a portion of the field with the identified seed type and density. For example, a field may be broken up into different management zones. The agricultural intelligence computer system may generate different recommendations for different management zones.

At step 912, input is received accepting the recommendation. For example, the graphical user interface may include one or more options for accepting the recommendation of the seed type and seeding density. The field manager computing device may send the input indicating acceptance of the recommendation in response to input selecting the one or more options.

At step 914, scripts are generated for controlling an agricultural implement to plant the particular agricultural field according to the recommendation. For example, the agricultural intelligence computer system may generate a prescription map for the agricultural field comprising a planting prescription of the selected seed and seeding density. The agricultural intelligence computer system may generate one or more scripts which, when executed by an application controller of an agricultural implement, causes the application controller to control the agricultural implement to cause the agricultural implement to plant a crop on the field according to the prescription map. The system may send the script to the application controller, thereby causing the agricultural implement to execute the prescription of the prescription map.

5. Machine Learning Models

A machine learning model is trained using a particular machine learning algorithm. Once trained, input is applied to the machine learning model to make a prediction, which may also be referred to herein as a predicated output or output.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output, as described above. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e., configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C #, Ruby, Lua, Java, Matlab, R, and Python.

5.1. Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input node, the activation value is simply an input value for the input. For an activation neuron, the activation value is the output of the respective activation function of the activation neuron.

Each edge from a particular node to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation node, the activation function of the neuron is applied to the weighted activation values and the bias.

5.2. Illustrative Data Structures for Neural Networks

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of nodes in layer L−1 and L is N[L−1] and N[L], respectively, the dimensions of matrix W are N[L−1] columns and N[L] rows.

Biases for a particular layer L may also be stored in matrix B having one column with N[L] rows.

The matrices W and B may be stored as a vector or an array in RAM memory, or a comma separated set of values in memory. When an artifact is persisted in persistent storage, the matrices W and B may be stored as comma separated values, in compressed and/serialized form, or other suitable persistent form.

A particular input applied to a neural network comprises a value for each input node. The particular input may be stored as a vector. Training data comprises multiple inputs, each being referred to as a sample in a set of samples. Each sample includes a value for each input node. A sample may be stored as a vector of input values, while multiple samples may be stored as a matrix, each row in the matrix being a sample.

When an input is applied to a neural network, activation values are generated for the hidden layers and output layer. For each layer, the activation values may be stored in one column of a matrix A having a row for every node in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of nodes and/or edges determines the size of matrices needed to implement a neural network. The smaller the number of nodes and edges in a neural network, the smaller matrices and amount of memory needed to store matrices. In addition, a smaller number of nodes and edges reduces the amount of computation needed to apply or train a neural network. Less nodes means less activation values need be computed, and/or less derivative values need be computed during training.

Properties of matrices used to implement a neural network correspond to neurons and edges. A cell in a matrix W represents a particular edge from a node in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e., number of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

5.3. Backpropagation

An ANN's output may be more or less correct. For example, an ANN that recognizes letters may mistake an I as an L because those letters have similar features. Correct output may have particular value(s), while actual output may have different values. The arithmetic or geometric difference between correct and actual outputs may be measured as error according to a loss function, such that zero represents error free (i.e., completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e., ceases to reduce) or vanishes beneath a threshold (i.e., approaches zero). Example mathematical formulae and techniques for feedforward multilayer perceptron (MLP), including matrix operations and backpropagation, are taught in a related reference "Exact Calculation Of The Hessian Matrix For The Multi-Layer Perceptron," by Christopher M. Bishop, the entire contents of which are hereby incorporated by reference as if fully set forth herein.

Model training may be supervised or unsupervised. For supervised training, the desired (i.e., correct) output is already known for each example in a training set. The training set is configured in advance by (e.g., a human expert, or via the labeling algorithm described above) assigning a categorization label to each example. For example, the training set for an ML model is labeled, by an administrator, with the workload types and/or operating systems running on the server device at the time the historical utilization data was gathered. Error calculation and backpropagation occurs as explained above.

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas unsupervised training discovers an apt intermediate vocabulary based more or less entirely on statistical tendencies that reliably converge upon optimality with sufficient training due to the internal feedback by regenerated decodings. A supervised or unsupervised ANN model may be elevated as a first class object that is amenable to management techniques such as monitoring and governance during model development such as during training.

5.4. Deep Context-Recurrent Neural Network

As described above, an ANN may be stateless such that timing of activation is more or less irrelevant to ANN behavior. For example, recognizing a particular letter may occur in isolation and without context. More complicated classifications may be more or less dependent upon additional contextual information. For example, the information content (i.e., complexity) of a momentary input may be less than the information content of the surrounding context. Thus, semantics may occur based on context, such as a temporal sequence across inputs or an extended pattern (e.g., compound geometry) within an input example. Various techniques have emerged that make deep learning be contextual. One general strategy is contextual encoding, which packs a stimulus input and its context (i.e., surrounding/related details) into a same (e.g., densely) encoded unit that may be applied to an ANN for analysis. One form of contextual encoding is graph embedding, which constructs and prunes (i.e., limits the extent of) a logical graph of (e.g., temporally or semantically) related events or records. The graph embedding may be used as a contextual encoding and input stimulus to an ANN.

Hidden state (i.e., memory) is a powerful ANN enhancement for (especially temporal) sequence processing. Sequencing may facilitate prediction and operational anomaly detection, which can be important techniques. A recurrent neural network (RNN) is a stateful MLP that is arranged in topological steps that may operate more or less as stages of a processing pipeline. In a folded/rolled embodiment, all of the steps have identical connection weights and may share a single one dimensional weight vector for all steps. In a recursive embodiment, there is only one step that recycles some of its output back into the one step to recursively achieve sequencing. In an unrolled/unfolded embodiment, each step may have distinct connection weights. For example, the weights of each step may occur in a respective column of a two dimensional weight matrix.

A sequence of inputs may be simultaneously or sequentially applied to respective steps of an RNN to cause analysis of the whole sequence. For each input in the sequence, the RNN predicts a next sequential input based on all previous inputs in the sequence. An RNN may predict or otherwise output almost all of the input sequence already received and also a next sequential input not yet received. Prediction of a next input by itself may be valuable. Comparison of a predicted sequence to an actually received (and applied) sequence may facilitate anomaly detection, as described in detail above.

Unlike a neural layer that is composed of individual neurons, each recurrence step of an RNN may be an MLP that is composed of cells, with each cell containing a few specially arranged neurons. An RNN cell operates as a unit of memory. An RNN cell may be implemented by a long short term memory (LSTM) cell. The way LSTM arranges neurons is different from how transistors are arranged in a flip flop, but a same theme of a few control gates that are specially arranged to be stateful is a goal shared by LSTM and digital logic. For example, a neural memory cell may have an input gate, an output gate, and a forget (i.e., reset) gate. Unlike a binary circuit, the input and output gates may conduct an (e.g., unit normalized) numeric value that is retained by the cell, also as a numeric value.

An RNN has two major internal enhancements over other MLPs. The first is localized memory cells such as LSTM, which involves microscopic details. The other is cross activation of recurrence steps, which is macroscopic (i.e., gross topology). Each step receives two inputs and outputs two outputs. One input is external activation from an item in an input sequence. The other input is an output of the adjacent previous step that may embed details from some or all previous steps, which achieves sequential history (i.e., temporal context). The other output is a predicted next item in the sequence.

Sophisticated analysis may be achieved by a so-called stack of MHLPs. An example stack may sandwich an RNN between an upstream encoder ANN and a downstream decoder ANN, either or both of which may be an autoencoder. The stack may have fan-in and/or fan-out between MLPs. For example, an RNN may directly activate two downstream ANNs, such as an anomaly detector and an autodecoder. The autodecoder might be present only during model training for purposes such as visibility for monitoring training or in a feedback loop for unsupervised training. RNN model training may use backpropagation through time, which is a technique that may achieve higher accuracy for an RNN model than with ordinary backpropagation.

5.5. Deep Context-Convolutional Neural Network

A convolutional neural network (CNN) is an MLP that incorporates at least one convolutional layer, which utilizes convolution (i.e., via multiplication or other dot product) in place of general matrix multiplication. For additional information regarding CNNs, see Chapter 9 ("Convolutional Networks") of Deep Learning by Ian Goodfellow, Yoshua Bengio, and Aaron Courville, MIT Press, 2016, the entire contents of which are incorporated by reference as if fully set forth herein.

What is claimed is:

1. A system comprising:
one or more processors;
a memory storing instructions which, when executed by the one or more processors, cause performance of:
storing a machine learning system trained to compute parameters for a probability distribution of yield values from a plurality of planting inputs, the plurality of planting inputs comprising field specific inputs and crop specific inputs, wherein the parameters for the probability distribution of yield values include a center parameter and one or more shape parameters;
receiving a plurality of particular planting inputs for a particular crop and a particular agricultural field;
using the stored machine learning system and the plurality of particular planting inputs, computing particular parameters for a particular probability distribution of yield values for the particular agricultural field, wherein the particular parameters include a center particular parameter of the particular probability distribution and one or more shape particular parameters of the particular probability distribution;
generating the particular probability distribution of yield values from the particular parameters;
using the particular probability distribution of yield values, determining a yield guarantee value;
causing display, on a client computing device, of a recommendation to plant the particular crop on the particular agricultural field, the recommendation including the yield guarantee value; and
receiving input from the client computing device indicating acceptance of the recommendation and, in response, generating one or more scripts comprising computer readable instructions which, when executed by one or more agricultural implements, cause the one or more agricultural implements to plant the particular crop on the particular agricultural field.

2. The system of claim 1, wherein planting inputs comprise categorical inputs comprising one or more of a product identifier, a field identifier, a farm identifier, or a yield identifier, and wherein the machine learning system is configured to generate embeddings from the categorical inputs.

3. The system of claim 1:
wherein the plurality of planting inputs comprises one or more location inputs, one or more soil feature inputs, and one or more environmental feature inputs; and
wherein the machine learning system comprises a plurality of location input layers, a plurality of soil feature input layers, a plurality of environmental feature layers, and a combination layer configured to combine outputs from the plurality of location input layers, plurality of soil feature input layers, and plurality of environmental feature layers.

4. The system of claim 3:
wherein the combination layer is further configured to combine the crop specific inputs with the outputs from the plurality of location input layers, plurality of soil feature input layers, and plurality of environmental feature layers.

5. The system of claim 1:
wherein the machine learning system is configured to separately compute the center parameter using a first subset of the plurality of planting inputs and the one or more shape parameters using a second subset of the plurality of planting inputs; and
wherein the machine learning system is configured to separately compute the center particular parameter of the particular probability distribution using a first subset of the plurality of particular planting inputs and the one or more shape particular parameters using a second subset of the plurality of particular planting inputs.

6. The system of claim 5, wherein the system is configured to compute the center parameter by constraining the center parameter based, at least in part, on a population density value of the plurality of planting inputs.

7. The system of claim 1, wherein the machine learning system is trained to compute the parameters for the particular probability distribution of yield values using a loss function comprising a negative log likelihood of observed yield values.

8. A method comprising:
storing a machine learning system trained to compute parameters for a probability distribution of yield values from a plurality of planting inputs, the plurality of planting inputs comprising field specific inputs and crop specific inputs, wherein the parameters for the probability distribution of yield values include a center parameter and one or more shape parameters;
receiving a plurality of particular planting inputs for a particular crop and a particular agricultural field;
using the stored machine learning system and the plurality of particular planting inputs, computing particular parameters for a particular probability distribution of yield values for the particular agricultural field, wherein the particular parameters include a center particular parameter of the particular probability distribution and one or more shape particular parameters of the particular probability distribution;
generating the particular probability distribution of yield values from the particular parameters;
using the particular probability distribution of yield values, determining a yield guarantee value;
causing display, on a client computing device, of a recommendation to plant the particular crop on the particular agricultural field, the recommendation including the yield guarantee value; and
receiving input from the client computing device indicating acceptance of the recommendation and, in response, generating one or more scripts comprising computer readable instructions which, when executed by one or more agricultural implements, cause the one or more agricultural implements to plant the particular crop on the particular agricultural field.

9. The method of claim 8, wherein planting inputs comprise categorical inputs comprising one or more of a product identifier, a field identifier, a farm identifier, or a yield identifier, and wherein the machine learning system is configured to generate embeddings from the categorical inputs.

10. The method of claim 8:
wherein the plurality of planting inputs comprises one or more location inputs, one or more soil feature inputs, and one or more environmental feature inputs; and
wherein the machine learning system comprises a plurality of location input layers, a plurality of soil feature input layers, a plurality of environmental feature layers, and a combination layer configured to combine outputs from the plurality of location input layers, plurality of soil feature input layers, and plurality of environmental feature layers.

11. The method of claim 10:
wherein the combination layer is further configured to combine the crop specific inputs with the outputs from the plurality of location input layers, plurality of soil feature input layers, and plurality of environmental feature layers.

12. The method of claim 8:
wherein the machine learning system is configured to separately compute the center parameter using a first subset of the plurality of planting inputs and the one or more shape parameters using a second subset of the plurality of planting inputs; and
wherein the machine learning system is configured to separately compute the center particular parameter of the particular probability distribution using a first subset of the plurality of particular planting inputs and the one or more shape particular parameters using a second subset of the plurality of particular planting inputs.

13. The method of claim 12, wherein the machine learning system is configured to compute the center parameter by constraining the center parameter based, at least in part, on a population density value of the plurality of planting inputs.

14. The method of claim 8, wherein the machine learning system is trained to compute the parameters for the particular probability distribution of yield values using a loss function comprising a negative log likelihood of observed yield values.

15. One or more non-transitory computer-readable media storing instructions which, when executed by one or more processors, cause performance of
storing a machine learning system trained to compute parameters for a probability distribution of yield values from a plurality of planting inputs, the plurality of planting inputs comprising field specific inputs and crop specific inputs, wherein the parameters for the probability distribution of yield values include a center parameter and one or more shape parameters;
receiving a plurality of particular planting inputs for a particular crop and a particular agricultural field;
using the stored machine learning system and the plurality of particular planting inputs, computing particular parameters for a particular probability distribution of yield values for the particular agricultural field, wherein the particular parameters include a center particular parameter of the particular probability distribution and one or more shape particular parameters of the particular probability distribution;
generating the particular probability distribution of yield values from the particular parameters;
using the particular probability distribution of yield values, determining a yield guarantee value;
causing display, on a client computing device, of a recommendation to plant the particular crop on the particular agricultural field, the recommendation including the yield guarantee value; and
receiving input from the client computing device indicating acceptance of the recommendation and, in response, generating one or more scripts comprising computer readable instructions which, when executed by one or more agricultural implements, cause the one or more agricultural implements to plant the particular crop on the particular agricultural field.

16. The one or more non-transitory computer-readable media of claim 15, wherein planting inputs comprise categorical inputs comprising one or more of a product identifier, a field identifier, a farm identifier, or a yield identifier, and wherein the machine learning system is configured to generate embeddings from the categorical inputs.

17. The one or more non-transitory computer-readable media of claim 15:
wherein the plurality of planting inputs comprises one or more location inputs, one or more soil feature inputs, and one or more environmental feature inputs; and
wherein the machine learning system comprises a plurality of location input layers, a plurality of soil feature input layers, a plurality of environmental feature layers, and a combination layer configured to combine outputs from the plurality of location input layers, plurality of soil feature input layers, and plurality of environmental feature layers.

18. The one or more non-transitory computer-readable media of claim 17:
wherein the combination layer is further configured to combine the crop specific inputs with the outputs from the plurality of location input layers, plurality of soil feature input layers, and plurality of environmental feature layers.

19. The one or more non-transitory computer-readable media of claim 15: wherein the machine learning system is configured to separately compute the center parameter using a first subset of the plurality of planting inputs and the one or more shape parameters using a second subset of the plurality of planting inputs; and
wherein the machine learning system is configured to separately compute the center particular parameter of the particular probability distribution using a first subset of the plurality of particular planting inputs and the one or more shape particular parameters using a second subset of the plurality of particular planting inputs.

20. The one or more non-transitory computer-readable media of claim 19, wherein the machine learning system is configured to compute the center parameter by constraining the center parameter based, at least in part, on a population density value of the plurality of planting inputs.

21. The one or more non-transitory computer-readable media of claim 15, wherein the machine learning system is trained to compute the parameters for the particular probability distribution of yield values using a loss function comprising a negative log likelihood of observed yield values.

* * * * *